United States Patent
Hirai (10) Patent No.: US 9,191,573 B2
(45) Date of Patent: Nov. 17, 2015

(54) IMAGE CAPTURING APPARATUS FOR DETERMINING AN EXPOSURE CONDITION BY CALCULATING APHOTMETRIC VALUE FOR EACH OBJECT REGION AND METHOD OF CONTROLLING THE SAME

(71) Applicant: CANON KABUSHIKI KAISHA, Tokyo (JP)

(72) Inventor: Shinya Hirai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/187,429

(22) Filed: Feb. 24, 2014

(65) Prior Publication Data

US 2014/0267885 A1    Sep. 18, 2014

(30) Foreign Application Priority Data

Mar. 15, 2013    (JP) .................................. 2013-054134

(51) Int. Cl.
*H04N 5/232* (2006.01)
*H04N 5/235* (2006.01)

(52) U.S. Cl.
CPC ......... *H04N 5/23229* (2013.01); *H04N 5/2351* (2013.01); *H04N 5/2355* (2013.01); *H04N 5/23293* (2013.01)

(58) Field of Classification Search
CPC . H04N 5/2353; H04N 5/355; H04N 5/35536; G03B 9/00
USPC ........................................................... 348/362
See application file for complete search history.

(56) References Cited

U.S. PATENT DOCUMENTS 6,204,881 B1 *  3/2001  Ikeda et al. .................... 348/362

FOREIGN PATENT DOCUMENTS

JP          4105933 B       6/2008

* cited by examiner

*Primary Examiner* — Mekonnen Dagnew
(74) *Attorney, Agent, or Firm* — Cowan, Liebowitz & Latman, P.C.

(57) ABSTRACT

An image capturing apparatus comprises an image capturing unit configured to capture an image; a determination unit configured to determine a plurality of object regions from the captured image; an acquisition unit configured to acquire a photometric value for each of the object regions; a decision unit configured to decide an exposure condition from the photometric value for each of the object regions; and a tone conversion unit configured to convert a tone of the captured image based on the exposure condition.

8 Claims, 7 Drawing Sheets

IMAGE CAPTURING APPARATUS FOR DETERMINING AN EXPOSURE CONDITION BY CALCULATING APHOTMETRIC VALUE FOR EACH OBJECT REGION AND METHOD OF CONTROLLING THE SAME

BACKGROUND OF THE INVENTION

1. Field of the Invention

The present invention relates to an image capturing technique of deciding an exposure condition by calculating a photometric value for each object region.

2. Description of the Related Art

An image capturing apparatus such as a digital camera captures an image in real time and causes a display device to perform through-the lens display, thereby allowing the user to decide a composition while checking objects on a screen. In this case, it is possible to adjust the brightness of a display image, as needed, in accordance with an object by calculating a photometric value from the image captured for display and deciding an exposure condition so as to set the level of the photometric value to a target level. When the user presses the shutter button, it is also possible to decide an exposure condition for an image for recording by using the photometric value of the image captured for display.

However, when shooting a scene including objects with large brightness differences, for example, shooting a backlit person against the bright sky as a background, the apparatus may not appropriately perform photometry. Assume that the apparatus has performed exposure to set the brightness of a person to an appropriate level. In this case, the signal level of the sky may exceed the dynamic range of the image capturing device, and the signal may be saturated. It is not possible to obtain an appropriate photometric value from a region in which the signal is saturated. In contrast to this, assume that the apparatus has performed exposure with priority given to the sky so as inhibit the signal level of the sky from being saturated. In this case, since the apparatus shoots the person at a level lower than the appropriate level, the displayed person becomes dark.

There is known a method of composing two images upon respectively deciding exposure conditions from a relatively bright region and a relatively dark region in a screen when shooting a scene including objects with large brightness differences (see, for example, Japanese Patent No. 4105933). However, even the method disclosed in Japanese Patent No. 4105933 cannot decide an appropriate exposure condition when a signal from a bright region is saturated.

In addition, although there has been proposed a method of shooting a plurality of images with different brightnesses and adjusting brightness by composing the respective images, no consideration is given to a case of shooting one image or the brightness of an image for display.

SUMMARY OF THE INVENTION

The present invention has been made in consideration of the aforementioned problems and realizes an image shooting technique which can adjust even the brightness of an image for display to an appropriate brightness by deciding an appropriate exposure condition even when shooting a scene including objects with large brightness differences.

In order to solve the aforementioned problems, the present invention provides an image capturing apparatus comprising: an image capturing unit configured to capture an image; a determination unit configured to determine a plurality of object regions from the captured image; an acquisition unit configured to acquire a photometric value for each of the object regions; a decision unit configured to decide an exposure condition from the photometric value for each of the object regions; and a tone conversion unit configured to convert a tone of the captured image based on the exposure condition.

In order to solve the aforementioned problems, the present invention provides a control method of an image capturing apparatus, the method comprising the steps of: determining a plurality of object regions from a captured image; acquiring a photometric value for each of the object regions; deciding an exposure condition from the photometric value for each of the object regions; and converting a tone of the captured image based on the exposure condition.

According to the present invention, it is possible to adjust even the brightness of an image for display to an appropriate brightness by deciding an appropriate exposure condition even when shooting a scene including objects with large brightness differences.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

[First Embodiment]

An embodiment in which the present invention is applied to an image capturing apparatus such as a digital camera which shoots still images and moving images will be described below. Note that the present invention can be implemented by any apparatus which can apply image processing to a captured image, including digital video cameras and personal computers as well as digital cameras.

<Apparatus Configuration>

An overview of the configuration and functions of an image capturing apparatus according to an embodiment of the present invention will be described with reference to FIG. 1.

Figure 1:
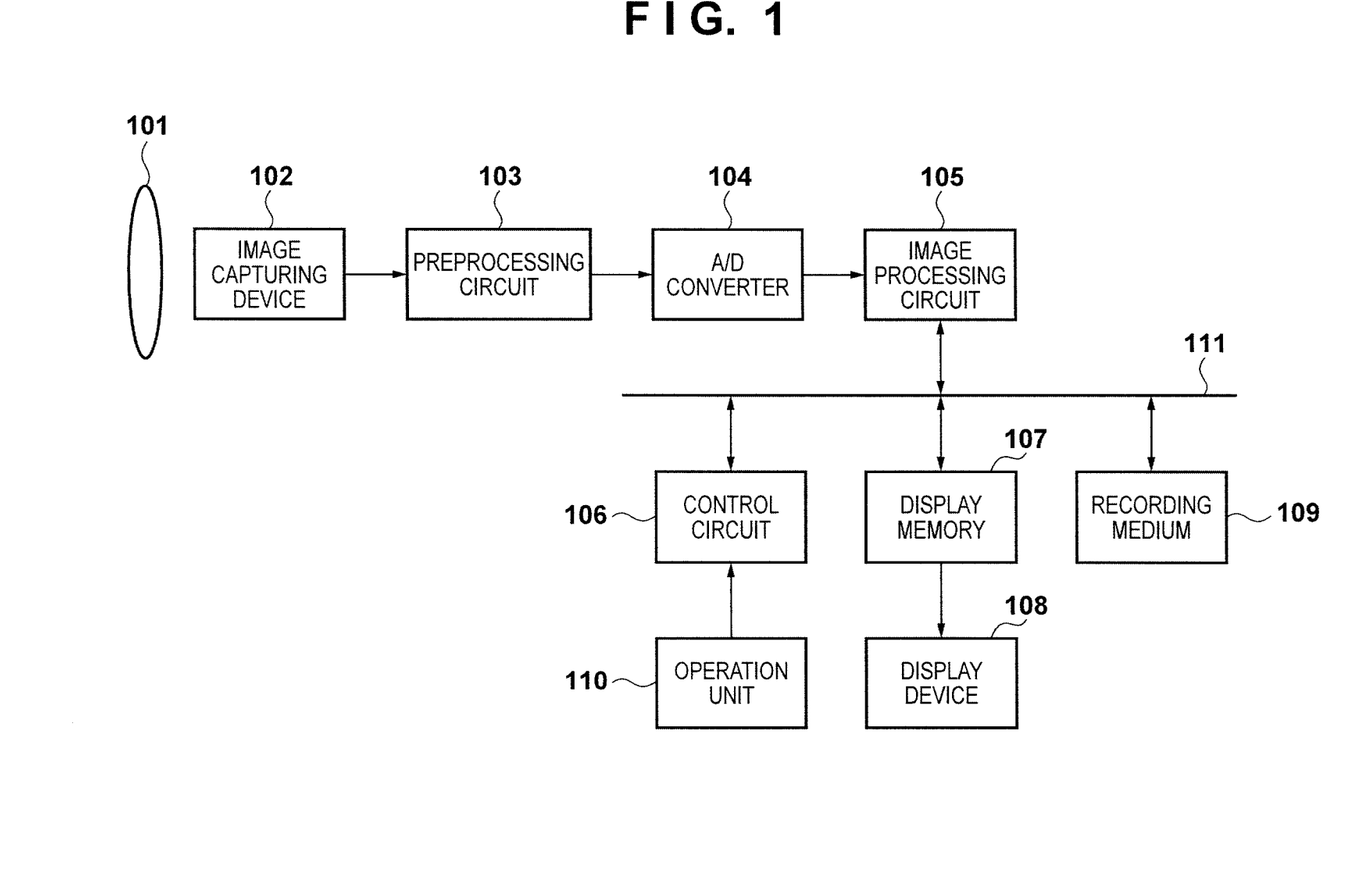
FIG. 1 is a block diagram showing an apparatus configuration according to an embodiment of the present invention.

In FIG. 1, an optical system 101 includes a lens group including a zoom lens and focus lens, an aperture diaphragm, and a shutter. The optical system 101 adjusts a magnification, focusing position, or incident light amount of an object image formed on an image capturing device 102. The image capturing device 102 is constituted by an image sensor including a photoelectric conversion element such as a CCD or CMOS. The image capturing device 102 generates an image signal by converting an object image into an electrical signal. Assume that in this embodiment, the image capturing device 102 is constituted by the CCD. In addition, the image capturing device 102 has color filters arranged in a Bayer pattern.

A preprocessing circuit 103 includes a CDS (Correlated Double Sampling) circuit and an amplifying circuit. The CDS circuit suppresses the dark current contained in the image signal generated by the image capturing device 102. The amplifying circuit amplifies the image signal output from the CDS circuit. An A/D converter 104 converts the analog image signal output from the preprocessing circuit 103 into a digital signal.

An image processing circuit 105 performs white balance processing, noise suppression processing, tone conversion processing, edge enhancement correction processing, and the like for the digital image signal output from the A/D converter 104, and outputs the resultant signals as a luminance signal Y and color difference signals U and V. The image processing circuit 105 calculates focus information indicating the luminance value or focusing state of an object from an image signal. The image processing circuit 105 can perform similar image processing for even the image signal read out from a recording medium 109 as well as the image signal output from the A/D converter 104.

A control circuit 106 controls the operation of a digital camera by controlling the respective circuits constituting a digital camera according to this embodiment. The image processing circuit 105 also performs driving control of the optical system 101 and image capturing device 102 based on the luminance value obtained from the image signal processed by the image processing circuit 105 and the operation signal output from an operation unit 110.

A display memory 107 is a memory which temporarily stores an image signal as the source of an image to be displayed on a display device 108. The display device 108 is formed from a liquid crystal display or organic EL (Electro Luminescence) display, and displays an image by using the image signal generated by the image capturing device 102 or the image signal read out from the recording medium 109. Displaying continuous image signals read out from the image capturing device 102 while updating them, as needed, allows the display device 108 to function as an electronic viewfinder (EVF). The display device 108 can display not only images but also character information representing the shutter speed and aperture value selected by the user or decided by the camera, sensitivity, and the like, a graph representing the luminance distribution obtained by the image processing circuit 105, and the like.

The recording medium 109 is a memory card, hard disk, or the like, and may be configured to be detachable from the camera main body or incorporated in the camera.

The operation unit 110 includes operation members such as switches, buttons, and a touch panel with which the user operates the digital camera and transmits instructions. A bus 111 is a transmission path for exchanging image signals and control signals among the image processing circuit 105, the control circuit 106, the display memory 107, and the recording medium 109.

<Operation at Time of Through-the Lens Image Display>

Image shooting processing at the time of through-the lens image display of the digital camera according to this embodiment will be described next with reference to FIGS. 2 to 6.

The image signal generated by the image capturing device 102 and processed by the preprocessing circuit 103, the A/D converter 104, and the image processing circuit 105 is displayed on the display device 108 via the display memory 107. In this case, with the EVF function described above, the image capturing device 102 continuously generates image signals, and the display device 108 updates and displays images of the object in real time by using the continuously read out image signals. The apparatus repeats the through-the lens image display processing until the user operates the shutter button included in the operation unit 110. When the user operates the shutter button, the apparatus records the image signal output from the image processing circuit 105 on the recording medium 109.

Figure 2:
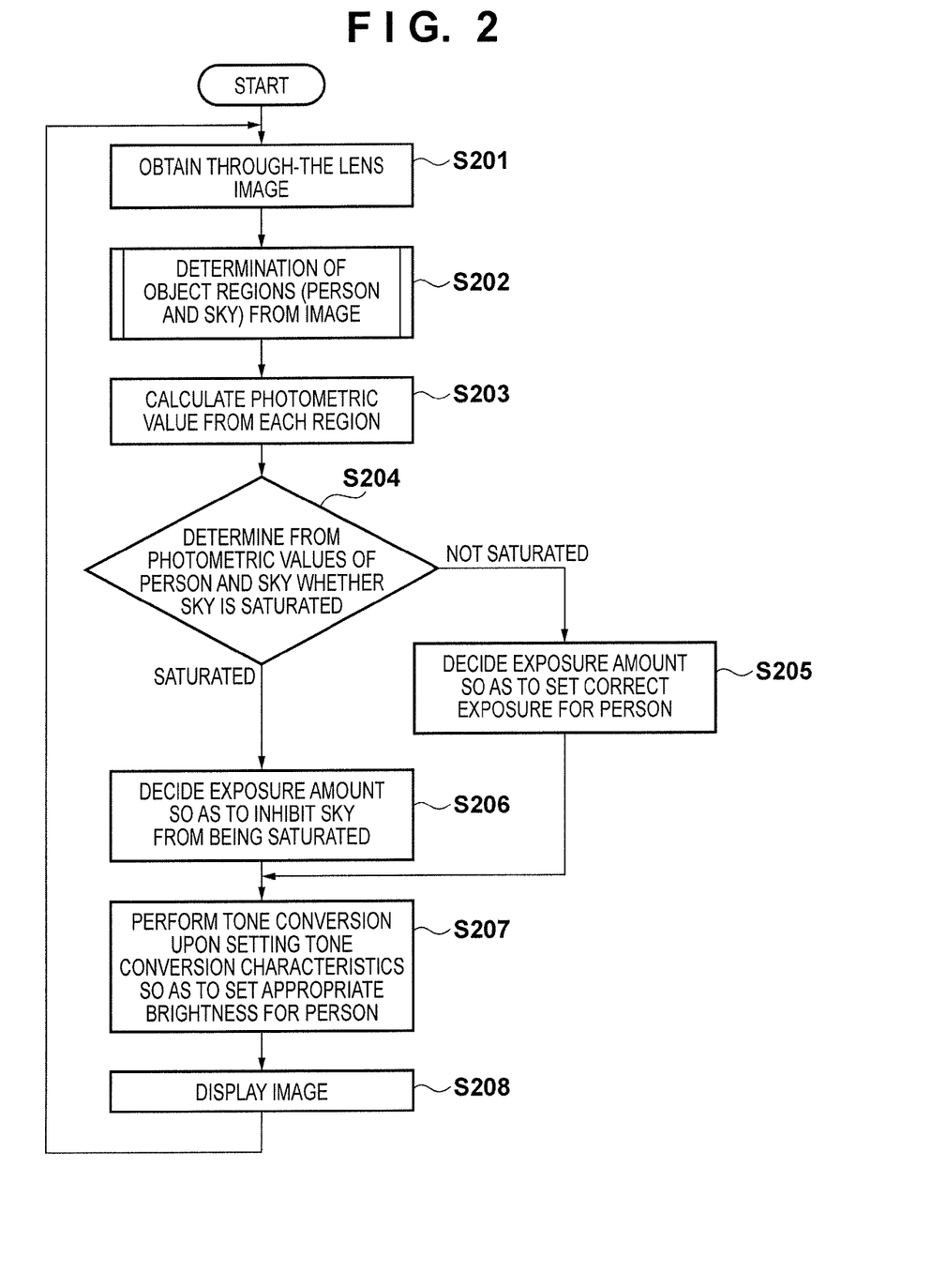
FIG. 2 is a flowchart showing the processing of calculating a photometric value and deciding an exposure condition at the time of through-the lens image display according to the first embodiment.

FIG. 2 shows the processing of calculating a photometric value and deciding an exposure condition at the time of through-the lens image display according to this embodiment. Note that when the user operates the operation unit 110 to input an instruction to start through-the lens image display, the control circuit 106 implements the processing in FIG. 2 by controlling the respective units of a camera 100 in accordance with input signals and programs.

Figure 3A:
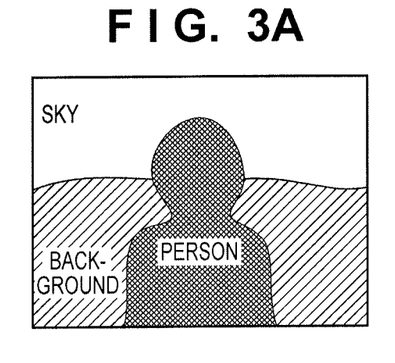
FIG. 3A is a view exemplifying an object to be shot.

In step S201, the control circuit 106 obtains a through-the lens image captured by the image capturing device 102. A case in which the object shown in FIG. 3A has been shot will be described below. The object in FIG. 3A is a backlit scene, in which the sky, the background, and the person become lower in brightness in the order named.

Figure 3B:
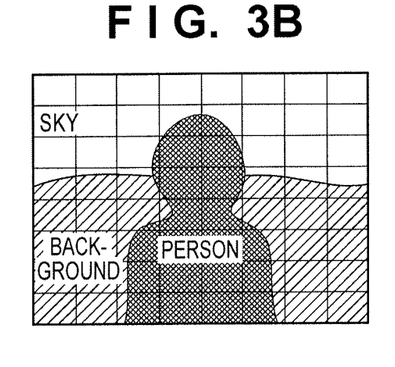
FIG. 3B is a view for explaining a method of dividing a screen.
Figure 3C:
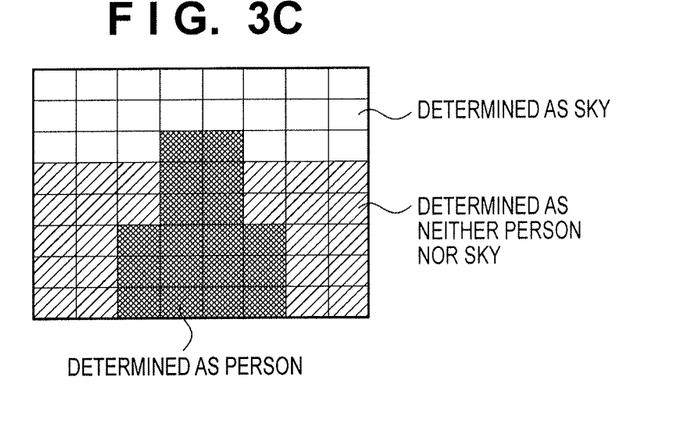
FIG. 3C is a view exemplifying a region determination result.

In step S202, the control circuit 106 determines the specific locations of the person and sky regions on the screen from the image exposed in step S201. According to the determination method to be used, the apparatus divides the image into a plurality of regions as shown in FIG. 3B, and performs determination on each region to specify whether the object is a person, sky, or something (to be referred to as a remaining region hereinafter) other than the person and the sky. FIG. 3C shows an example of the determination result. The method of determining a person and the sky will be described in detail later.

In step S203, the control circuit 106 calculates a photometric value for each object region by using the determination result obtained in step S202. More specifically, the control circuit 106 calculates the average value of luminances by using all the block regions determined as person regions, thereby obtaining a photometric value Yh of the region of the person. The control circuit 106 also calculates the average value of luminances by using all the block regions determined as sky regions, thereby obtaining a photometric value Ys of the sky.

In step S204, the control circuit 106 determines, by using the photometric value Yh of the person and the photometric value Ys of the sky, whether the sky is saturated when shooting the person with correct exposure. Assume that D range of the sensor is from 0 to Smax. In addition, letting Sh be a target signal level when a person is shot with correct exposure, if Yh and Ys satisfy $$Smax - Sh < Ys - Yh \qquad (1)$$

the control circuit 106 determines that when the person is shot with correct exposure, the sky is saturated. If inequality (1) does not hold, the control circuit 106 determines that the sky is not saturated.

Upon determining that the sky is not saturated, the control circuit 106 decides, in step S205, an exposure condition to shoot the person with correct exposure. If shooing has been performed with the Ev value of the current exposure being Ev1, the control circuit 106 may decide an exposure condition according to $$Ev=Ev1+\log_2(Yh/Sh) \quad (2)$$

In this manner, the apparatus decides an exposure condition to shoot the person with correct exposure by using equation (2) and inhibit the sky from being saturated.

Upon determining in step S204 that the sky is saturated when shooting the person with correct exposure, the control circuit 106 decides, in step S206, an exposure condition to inhibit the sky from being saturated. For example, letting Ss be a target signal level for the sky, the control circuit 106 decides an exposure condition according to $$Ev=Ev1+\log_2(Ys/Ss) \quad (3)$$

Note that if the difference between the luminance Ys of the sky and the luminance Yh of the person is extremely large, deciding an exposure condition according to equation (3) may make the luminance Yh of the person extremely lower than an appropriate level Sh of the person. In such a case, some restriction may be provided to an exposure condition so as to inhibit the person from becoming too dark. Assume that letting ΔEv_limit be a limit value, $$\Delta Ev\_limit=\log_2(Yh/(Sh-\Delta S))$$

In this case, if $\log_2(Ys/Ss) > \Delta Ev\_limit$, equation (3) may be rewritten into Ev=Ev1+ΔEv_limit.

where ΔS is a preset value. Note that if the luminance Ys of the sky is saturated in equation (3), the apparatus cannot always shoot the sky at a target level even under the decided exposure condition. However, sequentially repeating steps S201 to S206 makes the sky gradually reach the target level.

To generate an image for display, in step S207, the image processing circuit 105 performs tone conversion by setting tone conversion characteristics so as to display a person as a main object with an appropriate brightness. More specifically, if the apparatus has shot a person under the exposure condition decided in step S205, that is, an exposure condition to set correct exposure for the person, the image processing circuit 105 uses the standard tone conversion characteristics shown in FIG. 4. Note however that the output target level when the apparatus has shot a person with correct exposure is represented by S'h.

Figure 4:
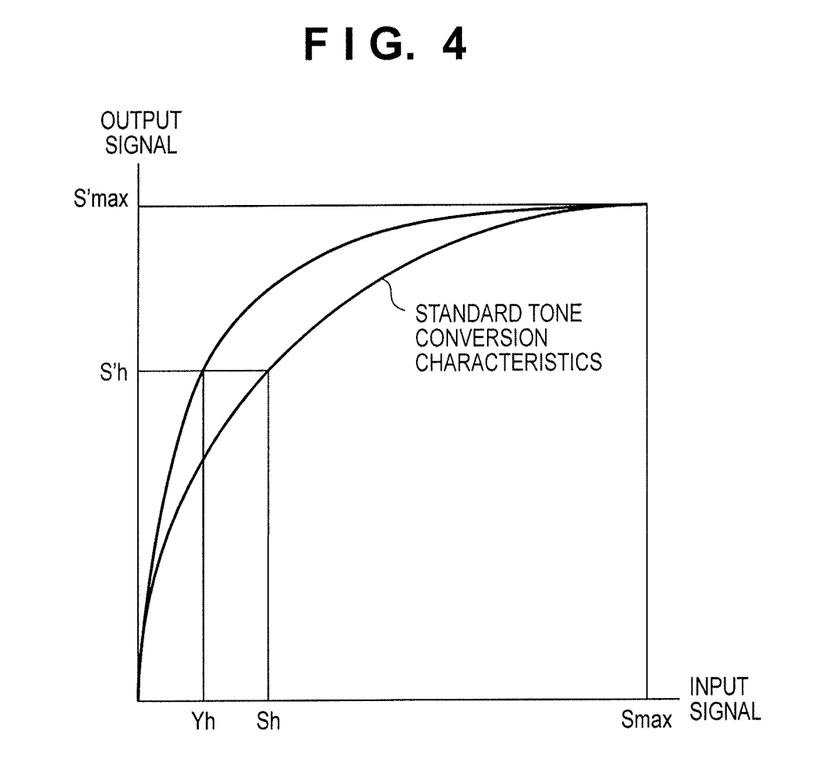
FIG. 4 is a graph exemplifying tone conversion characteristics.

If the apparatus performed shooting under the exposure condition decided in step S206, that is, an exposure condition to set the sky at an appropriate level, the image processing circuit 105 performs tone conversion by using tone conversion characteristics in which when the luminance level Yh is set for the person, an output signal passes the output target level S'h. Using such tone conversion characteristics can display the person at the appropriate level and also can implement tone expression without losing the tone of the sky. Although an object region is determined as a main object region in this case, a specific object other than the person may be determined as a main object.

In step S208, the control circuit 106 displays the image tone-converted in step S207 on the display device 108.

Repeating the above processing can display an image while controlling exposure.

<Object Determination Method>

An object determination method for each region in step S202 in FIG. 2 will be described with reference to FIG. 5.

Figure 5:
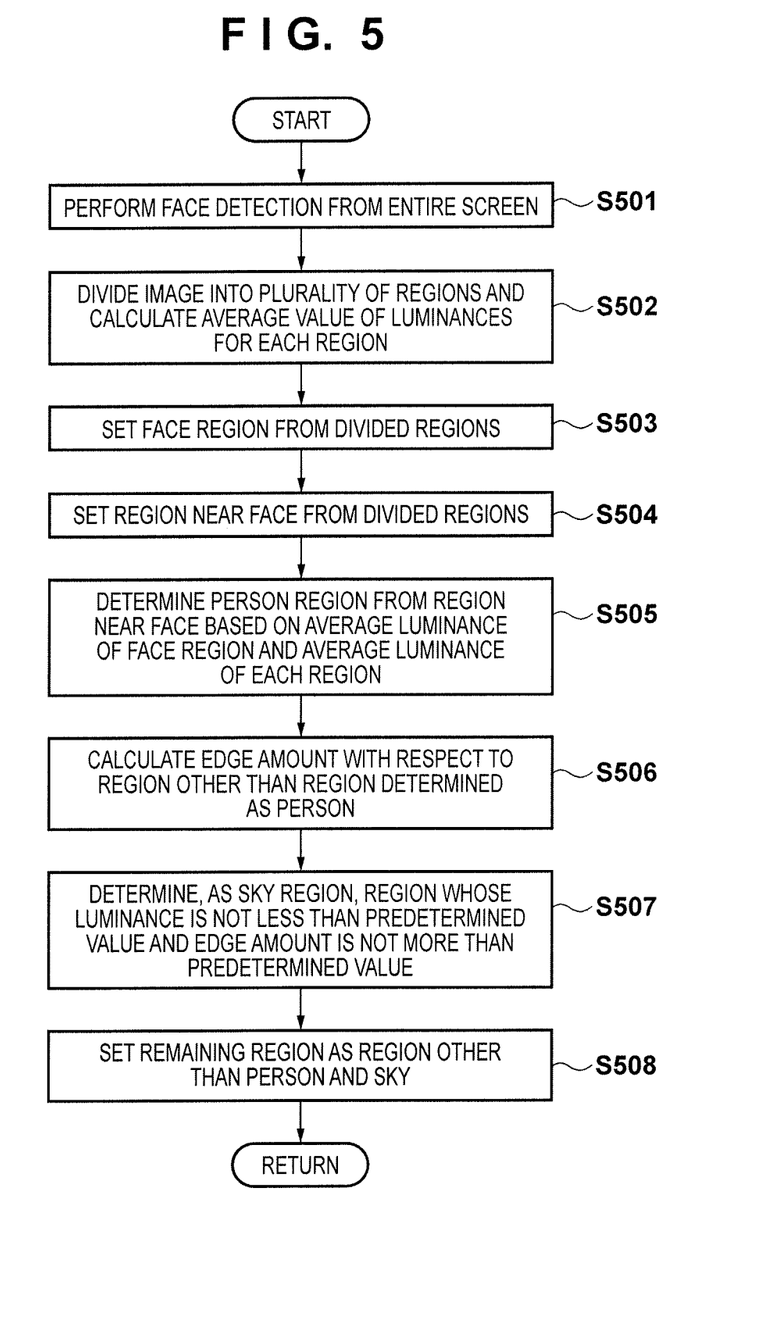
FIG. 5 is a flowchart showing the region determination processing in FIG. 2.
Figure 6:
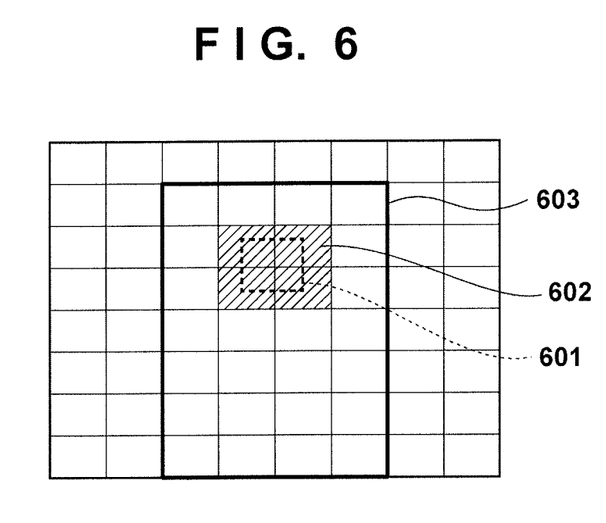
FIG. 6 is a view exemplifying a method of setting a face region and a region near the face.

Referring to FIG. 5, in step S501, the control circuit 106 detects the face of a person from the overall screen on which an image is exposed. When determining the face of a person, the control circuit 106 may determine a region in which the face exists by using a generally known face detection method. A broken line frame 601 in FIG. 6 indicates an example of a face detection result on the object in FIG. 3A.

In step S502, the control circuit 106 divides the screen into a plurality of regions and calculates the average value of luminances for each region, as shown in FIG. 3B. In the case shown in FIG. 3B, the control circuit 106 divides the screen into 8×8 regions and calculates the average value of luminances for each region In step S503, the control circuit 106 sets regions, of the divided regions, in which the face exists as face regions by using the face detection result in step S501.

In step S504, the control circuit 106 sets a region near the face by estimating the position at which the body exists from a periphery of the face region and the direction and size of the face. In the case shown in FIG. 6, the control circuit 106 sets a region in which the broken line frame 601 as the face detection result exists as a face region 602, and sets a region 603 near the face by selecting a region around the face region 602 and region on the lower side of the face as a rectangular shape.

In step S505, the control circuit 106 calculates the average value of the luminances of the face region set in step S504, and determines, as a person region, a region in which the difference between the calculated average value and the average value of the luminances of each region in the region near the face falls within a predetermined range.

In step S506, the control circuit 106 calculates an edge amount to determine whether a region which is not determined as a person region is a sky region. For example, the control circuit 106 sequentially applies a digital filter with coefficients [−1 0 2 0 −1] to the G signals in a divided region in the horizontal and vertical directions, and calculates an edge amount E by obtaining absolute values and integrating them within the region. The control circuit 106 performs this calculation for all the divided regions which are not determined as person regions.

In step S507, the control circuit 106 determines, as a sky region, a divided region which satisfies both the inequalities given below:

$$Y \geq TH\_Ys$$

$$E < TH\_E$$

where Y is a luminance and E is an edge amount. That is, the control circuit 106 determines, as a sky region, a bright region containing no edge, in which the luminance is equal to or more than a predetermined value and the edge amount is equal to or less than a predetermined amount.

In step S508, the control circuit 106 determines, as a remaining region, a region which is determined neither as a person region nor a sky region in step S507.

As described above, according to this embodiment, even when shooting a scene with large brightness differences, it is possible to obtain a photometric value by appropriately determining person and sky regions. In addition, it is possible to display a through-the lens image upon adjusting a person to an appropriate brightness.

[Second Embodiment]

Image shooting processing at the time of through-the lens image display according to the second embodiment will be described next.

This embodiment is configured to generate a plurality of images with different brightnesses based on the photometric values and exposure conditions obtained in the first embodiment, compose the respective images, and display the resultant image. The apparatus configuration and basic operation are the same as those in the first embodiment. Such image composition processing is effective for a scene with large brightness differences, and can generate an image having a wide dynamic range by shooting a plurality of images under different exposure conditions relative to the correct exposure level and composing the images.

Figure 7:
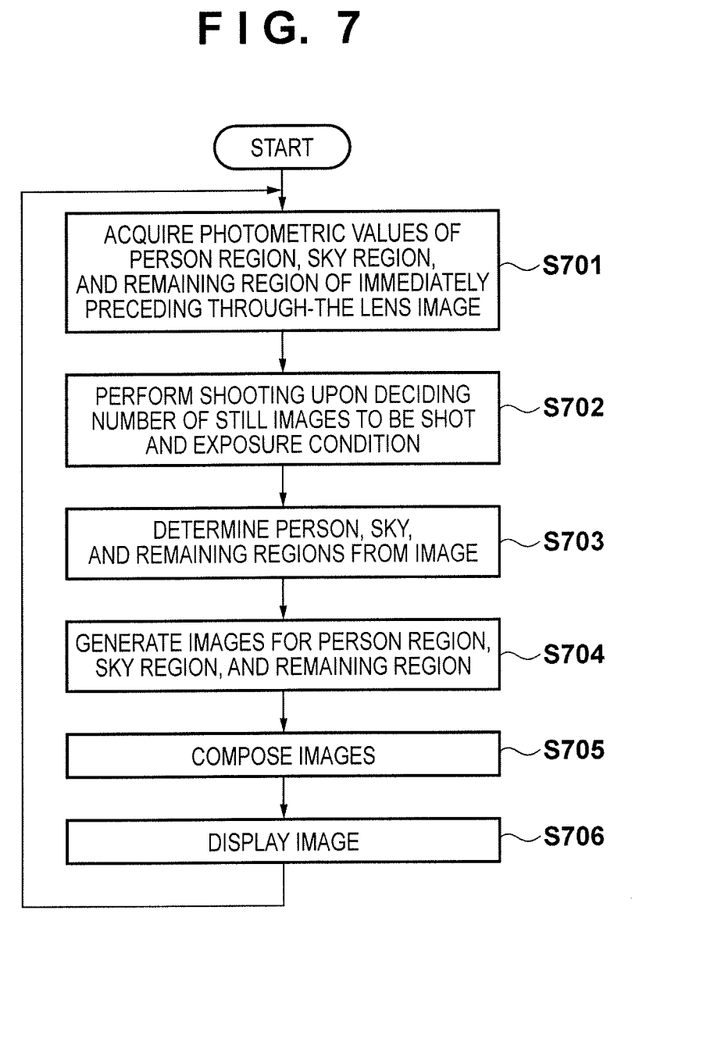
FIG. 7 is a flowchart showing the processing of calculating a photometric value and deciding an exposure condition at the time of through-the lens image display according to the second embodiment.

FIG. 7 shows the processing of deciding an exposure condition by calculating a photometric value at the time of HDR shooting according to this embodiment. Note that the processing shown in FIG. 7 starts when the user operates the shutter button included in the operation unit 110 during the display of the above through-the lens image.

Referring to FIG. 7, in step S701, a control circuit 106 acquires photometric values in a person region, a sky region, and a remaining region from an immediately preceding through-the lens image as in steps S201 to S203 in FIG. 5.

In step S702, the control circuit 106 performs shooting upon deciding the number of images required for HDR composition and an exposure condition. The control circuit 106 decides the number of images to be shot and the exposure condition based on a brightness Yh of a person region, a brightness Ys of a sky region, and a brightness Yb of a remaining region. For the sake of simplicity, a scene like that shown in FIG. 3A, that is, a case in which Ys>Yb>Yh, will be described.

If Ys−Yh<TH1 holds, since the brightness difference between the sky and the person is small, the control circuit 106 sets the number of images to be shot to 1, and sets an exposure condition for the immediately preceding through-the lens image display to Ev1. In this case, the control circuit 106 sets the target level of the sky to Ss and Ev=Ev1+$\log_2$(Ys/Ss). That is, since the sky is the brightest, the control circuit 106 sets an exposure condition so as to inhibit the sky from being saturated.

If Ys−Yh<TH1 does not hold, since the brightness difference between the sky and the person is large, the control circuit 106 sets the number of images to be shot to 3, and sets the respective exposure conditions as follows:

$$Ev\_s = Ev1 + \log_2(Ys/Ss)$$

$$Ev\_b = Ev1 + \log_2(Yb/Sb)$$

$$Ev\_h = Ev1 + \log_2(Yh/Sh)$$

where Yb is the luminance level of the background region, Sb is the target level of the remaining region, and Sh is the target level of the person region.

In step S703, the control circuit 106 determines a person region, a sky region, and a remaining region from the shot image. The control circuit 106 may use a determination method similar to that applied to through-the lens images in the first embodiment, that is, may follow the processing in FIG. 5. This processing differs from that described above in that the control circuit 106 sets a larger division number for an image to improve the region division accuracy, and divides the image into, for example, 512×512 regions.

In step S704, an image processing circuit 105 generates images for a person region, a sky region, and a remaining region, respectively. If the number of images to be shot is 3, since the images for the respective regions have been shot at correct exposure levels, the image processing circuit 105 may process each image by using the standard tone conversion characteristics in FIG. 4. If the number of an image to be shot is 1, the image processing circuit 105 outputs three images with different brightnesses. Since the image for the sky region has been shot such that the sky is set at the appropriate level, the image processing circuit 105 processes it in the same manner as described above. In addition, the images for the person region and the remaining region have been shot at levels lower than the appropriate levels, the image processing circuit 105 processes the images in the same manner as described above upon applying a gain to the image output from an A/D converter 104 so as to set it to the appropriate level. This makes it possible to obtain images whose gains are adjusted to the appropriate levels for the person region, the sky region, and the remaining region, respectively.

In step S705, with regard to the three images generated in the above manner, the image processing circuit 105 composes them for each divided region decided in step S703 while using an image for a person region for each region determined as a person region, an image for a sky region for each region determined as a sky region, and an image for a background region for each region determined as a background region.

In step S706, the control circuit 106 displays the image obtained by composition in step S705 on the display device 108.

As has been described above, according to this embodiment, it is possible to display an image in which person, sky, and background regions are respectively adjusted to appropriate brightnesses.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-054134, filed Mar. 15, 2013 which is hereby incorporated by reference herein in its entirety.

What is claimed is:

1. An image capturing apparatus comprising:
an image capturing unit configured to capture an image;
a determination unit configured to determine a plurality of object regions from the captured image;
an acquisition unit configured to acquire a photometric value for each of the object regions;
a decision unit configured to decide an exposure condition based on the photometric value for each of the object regions; and
a tone conversion unit configured to convert a tone of the captured image based on the exposure condition,
wherein the tone conversion unit sets tone conversion characteristics of the captured image from the exposure condition decided by the decision unit such that tone conversion characteristics in a case where the exposure condition is decided based on a photometric value of a first region from the plurality of object regions is different from tone conversion characteristics in a case where the exposure condition is decided based on a photometric value of a second region which is different from the first region from the plurality of object regions.

2. The apparatus according to claim 1, wherein the determination unit determines a main object region from the plurality of object regions, and
the tone conversion unit sets the main object region as the first region.

3. The apparatus according to claim 2, wherein the tone conversion unit converts a tone of the captured image such that a signal level of the first region after the tone conversion in a case where the exposure condition is decided based on a photometric value of the first region from the plurality of object regions is equal to a signal level of the first region after the tone conversion in a case where the exposure condition is decided based on a photometric value of a second region which is different from the first region from the plurality of object regions.

4. The apparatus according to claim 2, wherein the determination unit determines a sky region from the plurality of object regions, and the tone conversion unit sets the sky region as the second region.

5. The apparatus according to claim 4, wherein the exposure condition decided based on a photometric value of the main object region is an exposure condition in which a signal level of the sky region is not saturated when an image is captured under the decided exposure condition.

6. The apparatus according to claim 1, further comprising a display unit configured to display a captured image in real time.

7. A control method of an image capturing apparatus, the method comprising the steps of:
determining a plurality of object regions from a captured image;
acquiring a photometric value for each of the object regions;
deciding an exposure condition based on the photometric value for each of the object regions; and
converting a tone of the captured image based on the exposure condition,
wherein tone conversion characteristics of the captured image is set from the decided exposure condition such that tone conversion characteristics in a case where the exposure condition is decided based on a photometric value of a first region from the plurality of object regions is different from tone conversion characteristics in a case where the exposure condition is decided based on a photometric value of a second region which is different from the first region from the plurality of object regions.

8. A non-transitory computer-readable storage medium storing a program for causing a computer to execute the control method according to claim 7.

* * * * *